(12) United States Patent
Maeno

(10) Patent No.: US 7,085,493 B2
(45) Date of Patent: Aug. 1, 2006

(54) LINE PROCESSING EQUIPMENT

(75) Inventor: Yoshiharu Maeno, Tokyo (JP)

(73) Assignee: NEC Corporation, Tokyo (JP)

( * ) Notice: Subject to any disclaimer, the term of this patent is extended or adjusted under 35 U.S.C. 154(b) by 708 days.

(21) Appl. No.: 09/934,579

(22) Filed: Aug. 23, 2001

(65) Prior Publication Data

US 2002/0024697 A1 Feb. 28, 2002

(30) Foreign Application Priority Data

Aug. 23, 2000 (JP) .............................. 2000/251770

(51) Int. Cl.
*H04J 14/00* (2006.01)
(52) U.S. Cl. .............................. 398/45; 398/50; 398/55
(58) Field of Classification Search .................... 398/9, 398/19, 45, 50, 55, 56; 385/17, 4; 370/254; 714/4, 798
See application file for complete search history.

(56) References Cited

U.S. PATENT DOCUMENTS

| | | | | |
|---|---|---|---|---|
| 5,321,813 A | * | 6/1994 | McMillen et al. | .......... 714/798 |
| 5,490,252 A | * | 2/1996 | Macera et al. | .............. 709/249 |
| 6,647,208 B1 | * | 11/2003 | Kirby | .......................... 398/45 |
| 6,650,803 B1 | * | 11/2003 | Ramaswami et al. | ......... 385/17 |
| 6,856,600 B1 | * | 2/2005 | Russell et al. | .............. 370/244 |
| 2002/0097460 A1 | * | 7/2002 | Ikoma et al. | ............... 359/110 |
| 2002/0135835 A1 | * | 9/2002 | Lauder et al. | .............. 359/124 |

FOREIGN PATENT DOCUMENTS

| | | |
|---|---|---|
| JP | 58-84552 | 5/1983 |
| JP | 8-125717 | 5/1996 |
| JP | 2709782 | 10/1997 |

* cited by examiner

*Primary Examiner*—David C. Payne
(74) *Attorney, Agent, or Firm*—Sughrue Mion, PLLC

(57) ABSTRACT

A line connection reconfiguration means is provided for at least one line processing means and a connecting form including all of a connection of input line to line processing means, a connection of an output of a certain line processing means to another line processing means, a connection of an output of line processing means to an output line and a through connection of an input line to an output line is realized according to a connection setup of the line connection reconfiguration means.

20 Claims, 16 Drawing Sheets

LINE PROCESSING EQUIPMENT

BACKGROUND OF THE INVENTION

1. Field of the Invention

The present invention relates to a line processing equipment and, particularly, to a processing of a number of lines in a large-scale switching node provided in a mutual connection point between a plurality of networks.

2. Description of Related Art

It is conventional that a large-scale switching node for accommodating a number of lines in a mutual connecting point of a plurality of regional networks and/or long distance backbone networks is configured with a plurality of line processing equipments each provided for every one of different processing functions for lines and a plurality of line connection reconfiguration equipments for setting up or reconfiguring connections between the line processing equipments and connections between the line processing equipments and input/output lines.

As an example me such line processing equipment, FIG. 14 shows a configuration with using a line termination equipment and a plurality of line switch equipments. In FIG. 14, a connection between an input line and an input terminal of line termination equipment 82 and a connection between an output of line termination equipment 82 and an input terminal of line switch equipment 84 are set up or reconfigured by two line connection reconfiguration equipments 81 and 83. This configuration is disclosed in JP S58-84552 A.

On the other hand, FIG. 15 shows a line connection reconfiguration equipment, which utilizes an automated MDF (Main Distributing Frame) technology. In this configuration, connectors connected to ends of line cables derived through bobbin 91 to roll up an excessive line cable and line cable aligning board 92 are connected to connector plug array board 94 by a connection reconfiguration robot 93. With this configuration, an arbitrary connection reconfiguration between the input line and the output line is realized. This technology is disclosed in JP 2709782 B2.

Further, FIG. 16 shows a redundant configuration of a line connection reconfiguration equipment of a line processing equipment, for improving reliability of switching between a working system and a backup system by line connection reconfiguration equipments of these systems. In FIG. 16, when a failure occurs in working line connection reconfiguration equipment 105, the connection is switched over to backup line connection reconfiguration equipment 106 by protection switches 101 to 104 and 107 to 110. This technology is disclosed in JP H08-125717 A.

However, in the described conventional system disclosed in JP S58-84152 A, which include a plurality of line processing equipments connected in series in the order of processing and a plurality of line connection reconfiguration equipments provided between the line processing equipments and between the line processing equipments and input/output lines, there is a problem that it is impossible to set up or reconfigure the arranging order of the line processing equipments and the number of line processing-equipments every line.

Similarly, since, in the conventional system disclosed in JP 2709782 B2, a plurality of line processing equipments are connected in series according to the sequence of line processing and a plurality of connection reconfiguration equipments are provided between the line processing equipments and between the line processing equipment and the input/output lines, there is a problem that the number of required equipments is large and one line processing equipment must be provided for a processing, which is necessary for only a portion of the line.

Further, in the above mentioned redundant configuration disclosed in JP H08-125717 A, there is a problem that a plurality of protection switches corresponding in number to the number of lines are required.

SUMMARY OF THE INVENTION

An object of the present invention is to provide a line processing equipment capable of easily setting up or reconfiguring the processing sequence for line and the number of processing procedures every line.

In order to achieve the above mentioned object, the line processing equipment according to the present invention is featured by comprising at least one line processing means for processing respective lines; and line connection reconfiguration means to set up and reconfigure connections from input lines coming into said line processing equipment to either said line processing means or output lines going out of said line processing equipment and connections from said line processing means to either other line processing means necessary subsequently to said line processing means or said output lines.

According to the present invention, it is possible to realize all of a connection of the input lines to the line processing means, a connection of an output of a certain one of the line processing means to another line processing means, a connection of an output of a line processing means to an output line and a through-connection of an input line to an output line with using a single line connection reconfiguration means.

The line connection reconfiguration means can include a plurality of input terminals and a plurality of output terminals and sets up arbitrary connections between said input terminals and said output terminals and reconfigures said connections; and wherein said input lines ad outputs of said line processing means are connected to said input terminals respectively and said output terminals are connected to inputs of said line processing means and said output lines respectively.

The line connection reconfiguration means may have a redundant structure consisting of a plurality of element ale connection reconfiguration means cascaded serially so that any one of said element line connection reconfiguration means can set up and reconfigure said connections.

Said line connection reconfiguration means may include a connector plug array board having one surface onto which said input lines and outputs of said line processing means are connected through respective connectors and the other surface onto which said output lines and inputs of said line processing means are connected through respective connectors and an automatic mechanism manipulating insertion and pulling of said connectors on at least one of said one and the other surfaces according to setup and reconfiguration of said connections.

It is preferable that said automatic mechanism manipulates insertion and pulling of said connectors on both of said one and the other surfaces respectively.

Said input lines and said output lines may be optical fiber lines which transmit packet multiplexed, time division multiplexed and/or wavelength division multiplexed optical signals.

In such a case, at least one of said line processing means may be a packet switch for switching said packet multiplexed optical signal. At least two of said line processing means may be packet witches for switching said packet multiplexed optical signals and said line connection reconfiguration means may set up and reconfigure said connections from said outputs of some of said packet switches to said inputs of others of said packet switches.

Said line processing means may be a time division switch for switching said time division multiplexed optical signals.

Said line processing means may be a wavelength demultiplexer for demultiplexing said wavelength division multiplexed optical signals into a plurality of optical signals. Said wavelength demultiplexer may include a waveband demultiplexer for demultiplexing said wavelength division multiplexed optical signals into a plurality of optical signals each of which includes a waveband consisting of a plurality of wavelength.

Said line processing means may be a wavelength multiplexer for multiplexing a plurality of optical signals into a wavelength division multiplexed optical signal. Said wavelength multiplexer may include a waveband multiplexer for multiplexing optical signals each of which includes a waveband consisting of a plurality of wavelength into said wavelength division multiplexed optical signal.

At least one of said line processing means may be a wavelength converter for said optical signals, a circuit for monitoring optical signal quality of said optical signals, a circuit for generating test patterns and inserting said test patterns into said optical signals, or a line switch for switching said optical signals.

In the case of said line processing means is a line switch, said line connection reconfiguration means may set up and reconfigure said connections between said input optical fiber lines, inputs and outputs of said line switch and said output optical fiber lines, and configure working lines and backup lines and said line switch may carry out protection switching from said working lines to said backup lines when a failure occurs on said working lines.

A plurality of said line processing equipments may be interconnected to form a network so that said line switch carries out protection switching from working lines to said backup lines in a shared ring protection scheme, a redundant line protection scheme or a a shared backup line protection scheme.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Figure 1:
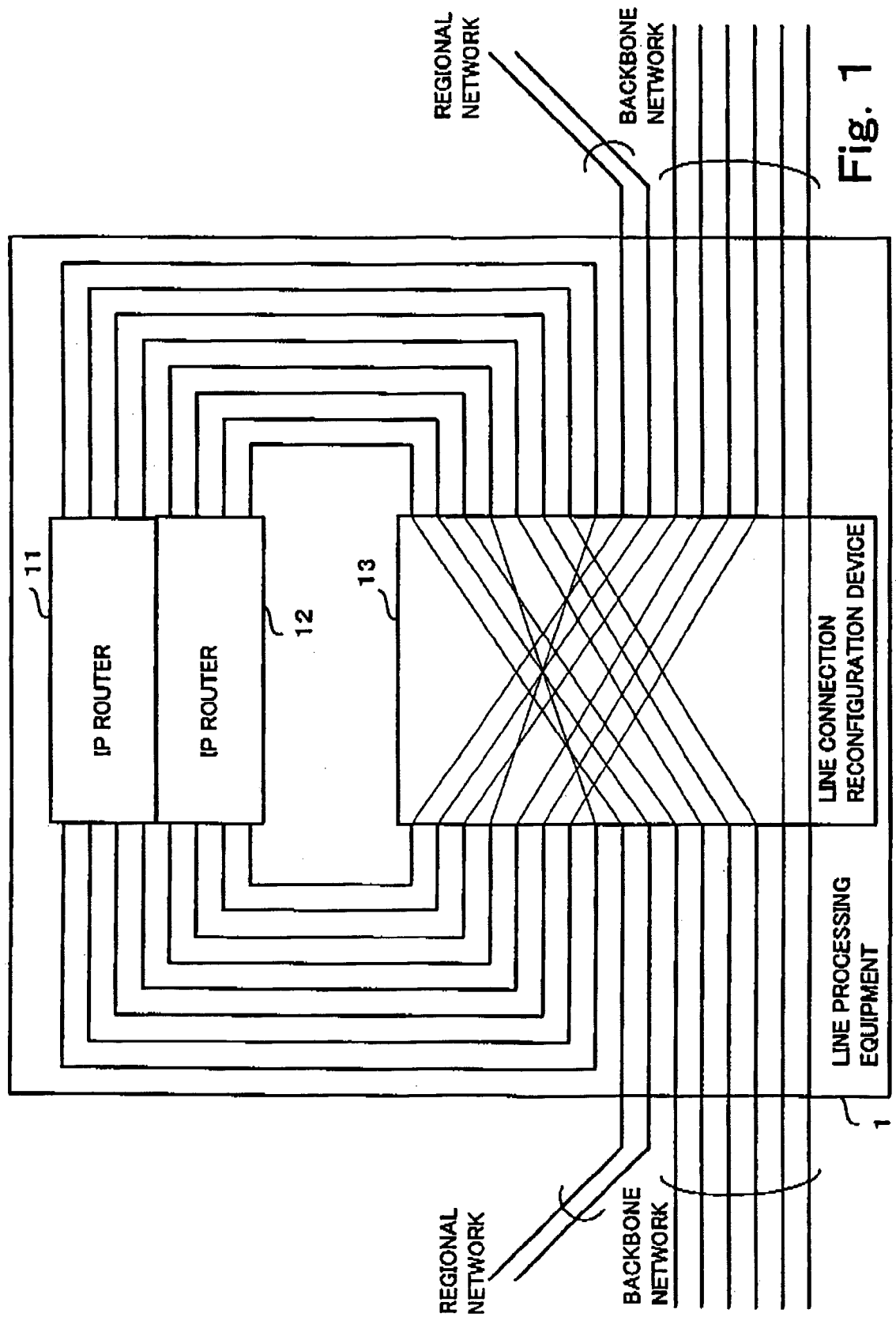
FIG. 1 is a block diagram showing a configuration of a line processing equipment according to a first embodiment of the present invention.

In FIG. 1 showing a first embodiment of the present invention, tine processing equipment 1 can provide a forwarding function in the unit of an IP (Internet Protocol) packet multiplexed into one or more specific input lines from regional networks and/or long distance backbone networks.

Line processing equipment 1 comprises 4 by 4 IP routers 11 and 12 having 4 input terminals and 4 output terminals for forwarding IP packets as a line processing means and line connection reconfiguration device 13s. Line connection reconfiguration device 13 connects input lines from the regional networks and/or the long distance backbone networks to the input terminals of IP routers 11 and 12 for processing the respective lines or to output lines to the regional networks and/or long distance backbone networks. And line connection reconfiguration device 13 also connects the output terminals of IP routers 11 and 12 to another input terminals of IP routers 11 and 12, which perform a forwarding function successively, or to the output lines to the regional networks and/or long distance backbone networks.

Line connection reconfiguration device 13 is provided with a plurality of input terminals and a plurality of output terminals and can set up arbitrary connection between the input terminals and the output terminals and reconfigure connections between the input and output terminals arbitrarily. The input terminals of line connection reconfiguration device 13 are connected to the input lines from the regional networks and/or long distance backbone networks and the output terminals of the line processing means, respectively. And the output teals thereof are connected to the output lines to the regional networks and/or long distance backbone networks and to the output terminals of the line processing means, respectively.

In the configuration shown in FIG. 1, the input lines from a regional network are connected to input terminals #9 and #10 of line connection reconfiguration device 13 and the input line from a long distance backbone network are connected to input terminals #11 and #16. Output terminals #9 and #10 of line connection reconfiguration device 13 are connected to the output lines to the regional network and output terminals #11 and #16 thereof are connected to the output lines to the long distance backbone network. Each of IP routers 11 and 12 has 4 input terminals and 4 output terminals configuration. Output terminals #1 to #4 of like connection reconfiguration device 13 are connected to the input terminals of IP router 12 and output terminals #5 to #8 are connected to the input terminals of IP router 11. The output terminals of IP router 12 are connected to input terminals #1 to #4 of line connection reconfiguration device 13 and the output terminals of IP router 11 are connected to input terminals #5 to #8 of line connection reconfiguration device 13.

An example of connections between the input terminals and the output terminals of line connection reconfiguration device 13 will be described. These connections are set up in case where signals on the input lines connected to input terminals #9 to #14 of line connection reconfiguration device 13 are transferred in the unit of an IP packet and signals on the input lines connected to input terminals #15 and #16 of line connection reconfiguration device 13 are transferred in the unit of a whole line.

In order to configure an IP router having larger capacity by mutually connecting individual IP routers 11 and 12, input terminal #4 of line connection reconfiguration device 13 is connected to output terminal #8 thereof and input terminal #8 is connected to output terminal #4. With this connection setup, a 6 by 6 IP router having output terminals #1 to #3 and #5 to #7 of line connection reconfiguration device 13 as input terminals and having input terminals #1 to #3 and #5 to #7 thereof as output terminals is configured. In order to connect the input lines to the 6 by 6 IP router, input terminals #9 to #14 of line connection reconfiguration device 13 are connected to output terminals #1 to #3 and #5 to #7 thereof, respectively. And in order to connect the output lines to the 6 by 6 IP router, input terminals #1 to #3 and #5 to #7 of line connection reconfiguration device 13 are connected to output terminals #9 to #14 thereof, respectively.

Line connection reconfiguration device 13 is set up to connect input terminals #15 and #16 to output terminals #15 and #16, respectively, so that signals on the input lines connected to input terminals #15 and #16 are transferred in the unit of a whole line, instead of an IP packet.

In the first embodiment configured as mentioned above, it is possible to set up line connection reconfiguration device 13 such that signals on one or more specific input lines can be forwarded in the unit of an IP packet. By adding IP routers as line processing means, it is also possible to set up line connection reconfiguration device 13 such that signals on all of the input lines can be forwarded in the unit of an IP packet.

By reconfiguring line connection reconfiguration device 13 such that other input lines are connected to IP routers 11 and 12, which were provided for input lines for which IP packet forwarding becomes unnecessary, IP routers 11 and 12 can be used efficiently.

Further, by adding IP routers and setting up connections therebetween, it is possible to expand a total IP packet forwarding capacity.

Further, it is possible to set up optimal connection patterns between a plurality of IP routers to be fit for various uses. When a number of IP routers, each of which has a number of input terminals and a number of output terminals, are installed as line processing means, it is possible to configure a large capacity IP router which has an internal connection pattern in a crossbar topology or in a hyper-cube topology between the line processing means. In such case, it is also possible to change the number of input and/or output terminals and the terminals themselves, which realize the connection patterns between the line processing means.

Although the IP router is described as the line processing means in this embodiment, a switch element for switching between lines or between lines, on which time division multiplexed or wavelength multiplexed signals propagate, or an ATM (Asynchronous Transfer Mode) switch may be used as line processing means.

Figure 2:
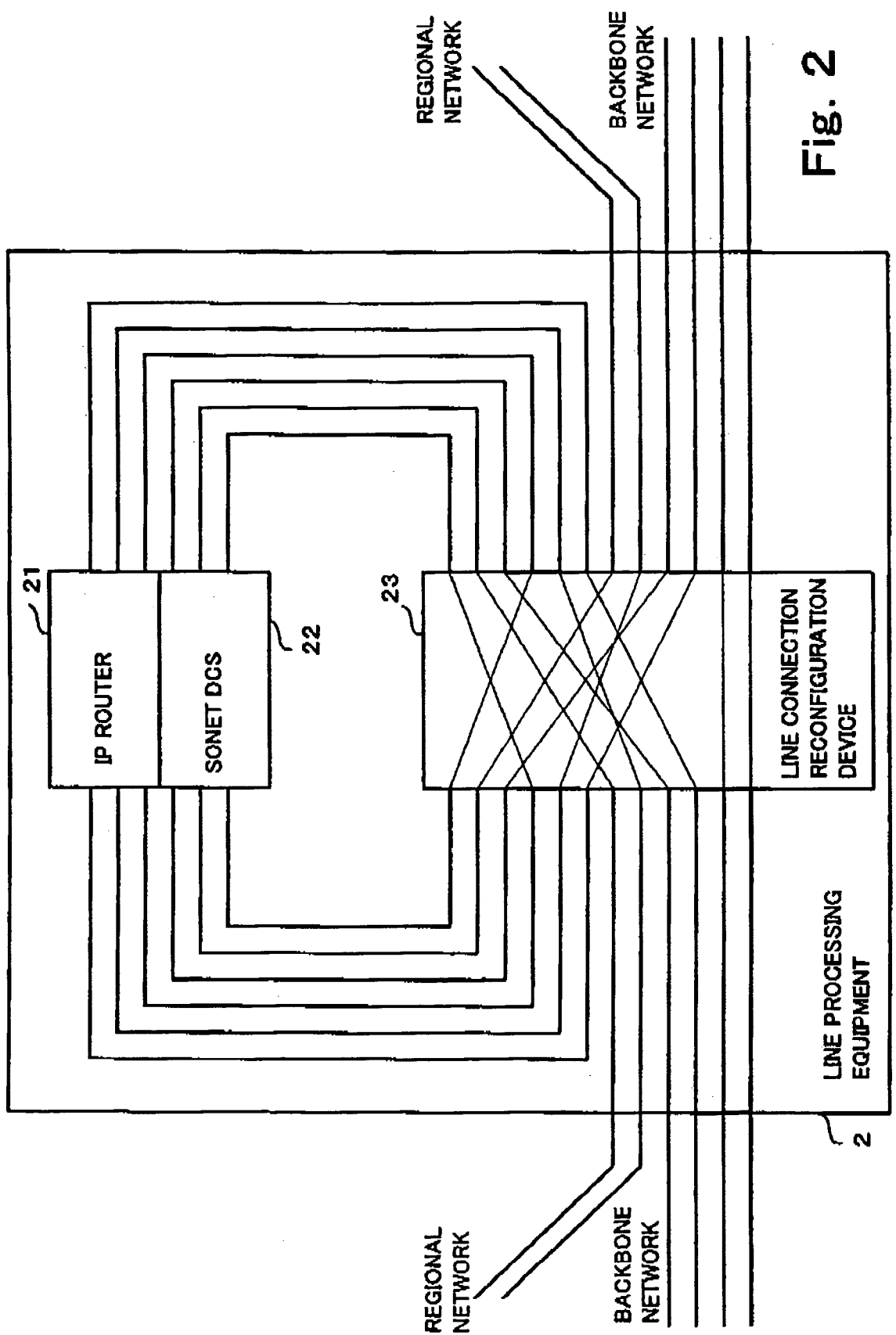
FIG. 2 is a block diagram showing a configuration of a line processing equipment according to a second embodiment of the present invention.

FIG. 2 is a block diagram showing a configuration of line processing equipment 2 according to a second embodiment of the present invention. Line processing equipment 2 can provide, on demand, a function of IP packet forwarding for one or more specific input lines from regional networks and/or long distance backbone and functions of demultiplexing, DCS (Digital Cross-connect System) and multiplexing for other one or more specific input lines on which SONET (Synchronous Optical Network) time division multiplexed frames are transferred.

Line processing equipment 2 includes, as line processing means, IP router 21 having 3 input terminals and 3 output terminals and SONET DCS 22 having 3 input terminals and 3 output terminals. And line processing equipment 2 can provide a different function suitable for every input line by suitably setting up line connection reconfiguration device 23 similarly to the first embodiment. Since an internal connection between IP router 21 and SONET DCS 22 can be set up in this embodiment, it is possible to provide both IP forwarding and DCS functions to one or more specific input lines.

Although IP router 21 for processing lines in a network layer and SONET DCS 22 for processing lines in a physical layer are shown as the line processing means in the second embodiment, it is also possible to provide a processing function in different hierarchical layers by installing various line processing means such as an ATM switch or a frame relay switch for processing lines in a data link layer and so on.

Figure 3:
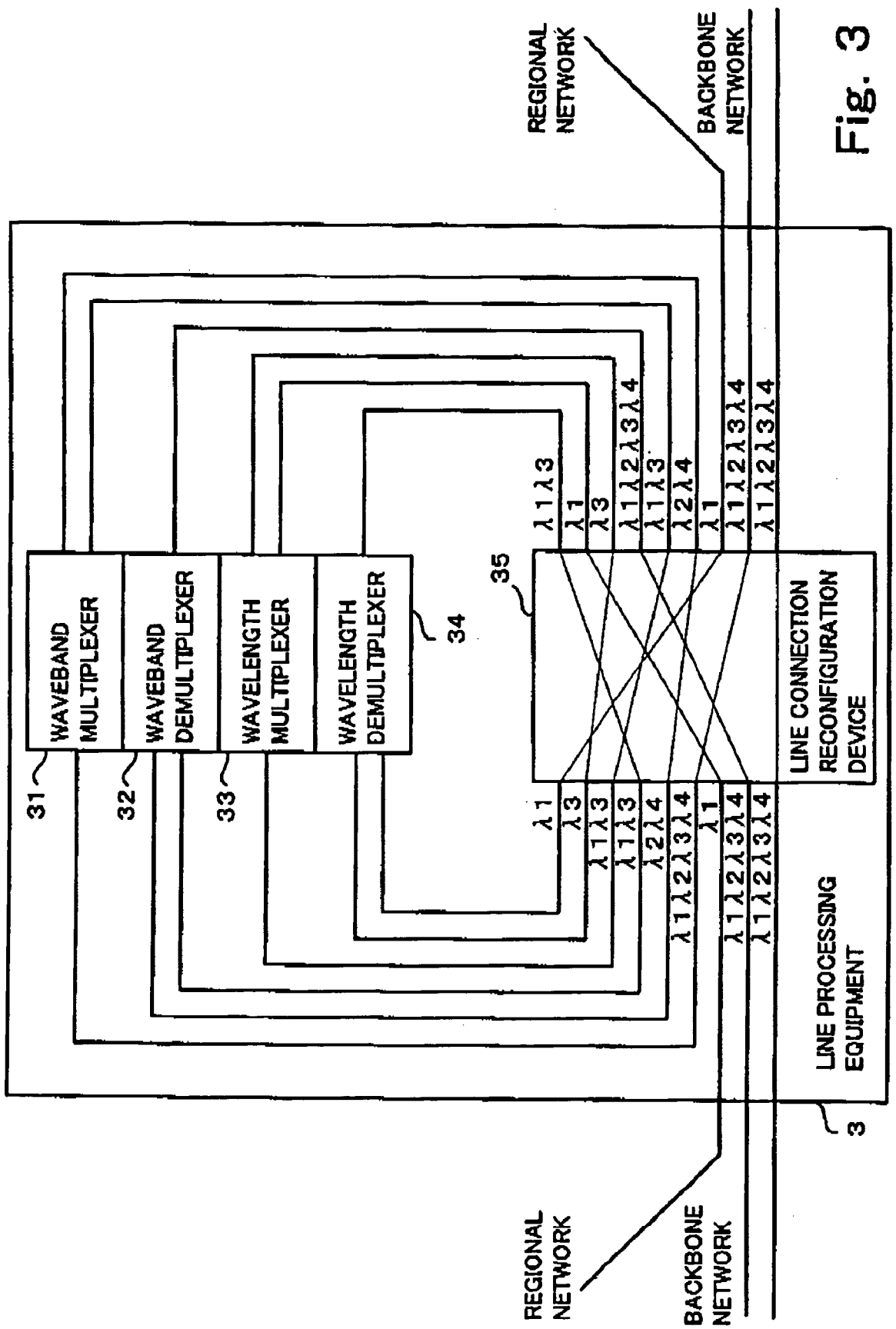
FIG. 3 is a block diagram showing a configuration of a line processing equipment according to a third embodiment of the present invention.

FIG. 3 is a block diagram showing a configuration of line processing equipment 3 according to a third embodiment of the present invention. Line processing equipment 3 can provide, on demand, multiplexing and demultiplexing functions in the unit of wavelength and/or in the unit of waveband for one or more specific input optical fiber lines from regional networks and/or long distance backbone networks on which wavelength division multiplexed signals are transferred. The waveband is a group of wavelengths. The number of wavelengths in a waveband is smaller than the number of wavelengths multiplexed into an optical fiber line.

Line processing equipment 3 includes, as line processing means, waveband multiplexer 31 for multiplexing a plurality of wavebands into a signal on an optical fiber line, waveband demultiplexer 32 for demultiplexing a signal on an optical fiber line into a plurality of wavebands, wavelength multiplexer 33 for multiplexing a plurality of wavelengths into a waveband and wavelength demultiplexer 34 for demultiplexing a waveband into a plurality of wavelengths. Line processing equipment 3 further includes optical fiber line connection reconfiguration device 35 for reconfiguring connections among the input optical fiber lines, the output optical fiber lines and the line processing means for every wavelength. And line processing equipment 3 performs the required wavelength multiplexing/demultiplexing and the required waveband multiplexing/demultiplexing.

An example of the setup of optical fiber line connection reconfiguration device 35 will be described with reference to FIG. 3. An input optical fiber line with wavelength λ1 from a regional network and input optical fiber lines with wavelengths λ1, λ2, λ3 and λ4 from a long distance backbone network are connected to the input terminals of optical fiber line connection reconfiguration device 35.

Wavelengths λ1, λ2, λ3 and λ4 multiplexed on one of the two input optical fiber lines from the long distance backbone network are demultiplexed to a first waveband including wavelengths λ1 and λ3 and a second waveband including wavelengths λ2 and λ4 by waveband demultiplexer 32. The first waveband is further demultiplexed to wavelength λ1 and wavelength λ3 by wavelength demultiplexer 34. Wavelength λ1 is connected to an output optical fiber line to the regional network. The demultiplexed wavelength λ3, together with wavelength λ1 from the regional network, is multiplexed to the first waveband including wavelengths λ1 and λ3 by wavelength multiplexer 33, further multiplexed, together with the second waveband and including wavelengths λ2 and λ4, by waveband multiplexer 31 into an output optical fiber line to the long distance backbone network.

Since demultiplexing of the second waveband into wavelengths by waveband demultiplexer 32 is not required, only the function of multiplexing/demultiplexing in the unit of a waveband is provided for the second waveband. This is effective in not only reducing the number of required line processing means but also preventing degradation of optical transmission quality due to repetitive multiplexing/demultiplexing.

Inputs from the long distance backbone network through other input optical fiber lines are outputted to output optical fiber lines to the long distance backbone network as they are.

In the third embodiment, the line processing means has the configuration with which the multiplexing/demultiplexing function in the unit of a wavelength or in the unit of a waveband is realized. However, by installing IP routers and/or SONET DCS mentioned in the second embodiment in the third embodiment, it is possible to provide a forwarding function in the unit of an IP packet and/or a demultiplexing/multiplexing function in in the unit of a SONET frame for input optical fiber lines on which wavelength division multiplexed signals are transferred.

Figure 4:
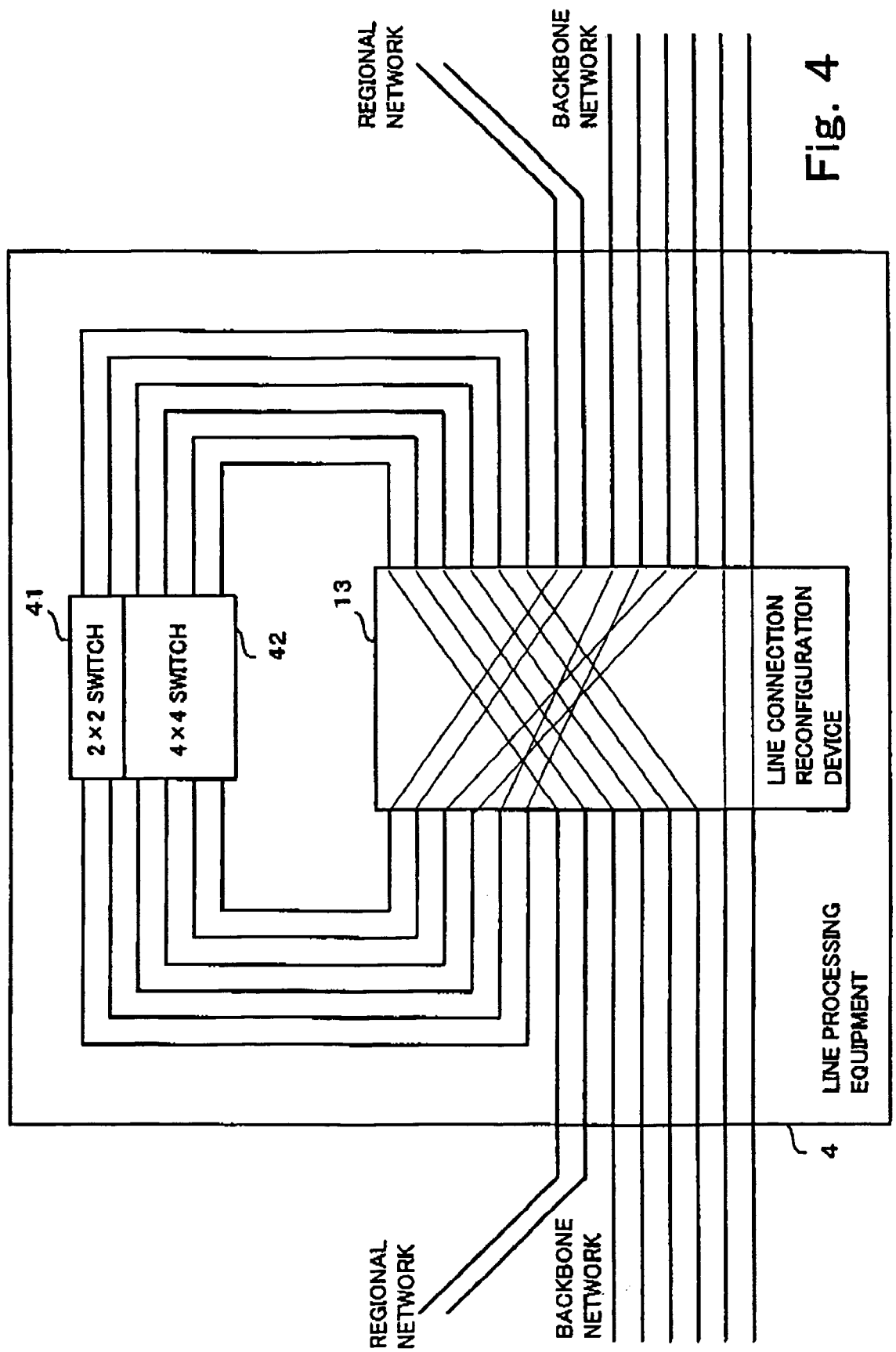
FIG. 4 is a block diagram showing a configuration of a line processing equipment according to a fourth embodiment of the present invention.

FIG. 4 is a block diagram showing a configuration of line processing equipment 4 according to a fourth embodiment of the present invention, In FIG. 4, line processing equipment 4 can provide a protection switching function which realizes switch-over between working lines and backup lines arbitrarily set up for input lines from regional networks and/or long distance backbone networks.

Line processing equipment 4 includes, as line processing means, 2 by 2 line switch 41 and 4 by 4 line switch 42. Line switch 42 provides a protection switching function to switch over from the working lines to the backup lines and an ADM (Add-Drop Multiplexer) function to add input lines from regional networks to long distance backbone networks and to drop output lines from the long distance backbone networks to the regional networks. Line processing equipment 4 further includes line connection reconfiguration device 43 for setting up arbitrary connections between input terminals and output terminals to configure the working lines and backup lines. Line connection reconfiguration device 43 connects input lines and output lines from the regional networks to input lines and output lines from the long distance backbone networks by the ADM fiction.

Line switches 41 and 42 switches in the unit of a whole line without respect to multiplexed unit on the line such as packets or wavelengths. Generally, various devices called optical switches can provide such function for optical fiber lines. An automated MDF is also a kind of such optical switches and can provide a similar function with that of the line switches. Line switches can be used not only for a protection switching (switch-over from a working line to a backup line) but also for other applications.

In the fourth embodiment, line switches 41 and 42 have a 2 input terminals and 2 output terminals configuration and a 4 input terminals and 4 output terminals configuration respectively. However, the number of input and output terminals can be selected adequately.

In a network configured by interconnecting a plurality of line processing equipment, on which line switches are installed as line processing means as shown in FIG. 4, when a failure occurs within a working line or line processing equipment, the working line can be switched over to a backup line by operating line processing means. This procedure is called protection swtitching. For fast protection, fast line switches such as micro-electro-mechanical switch (MEMS), waveguide-type thermo-optic (TO) switch, or else can be used. For a line connection reconfiguration device, an automated MDF technology can be applied. Some protection schemes will be described below.

Figure 5:
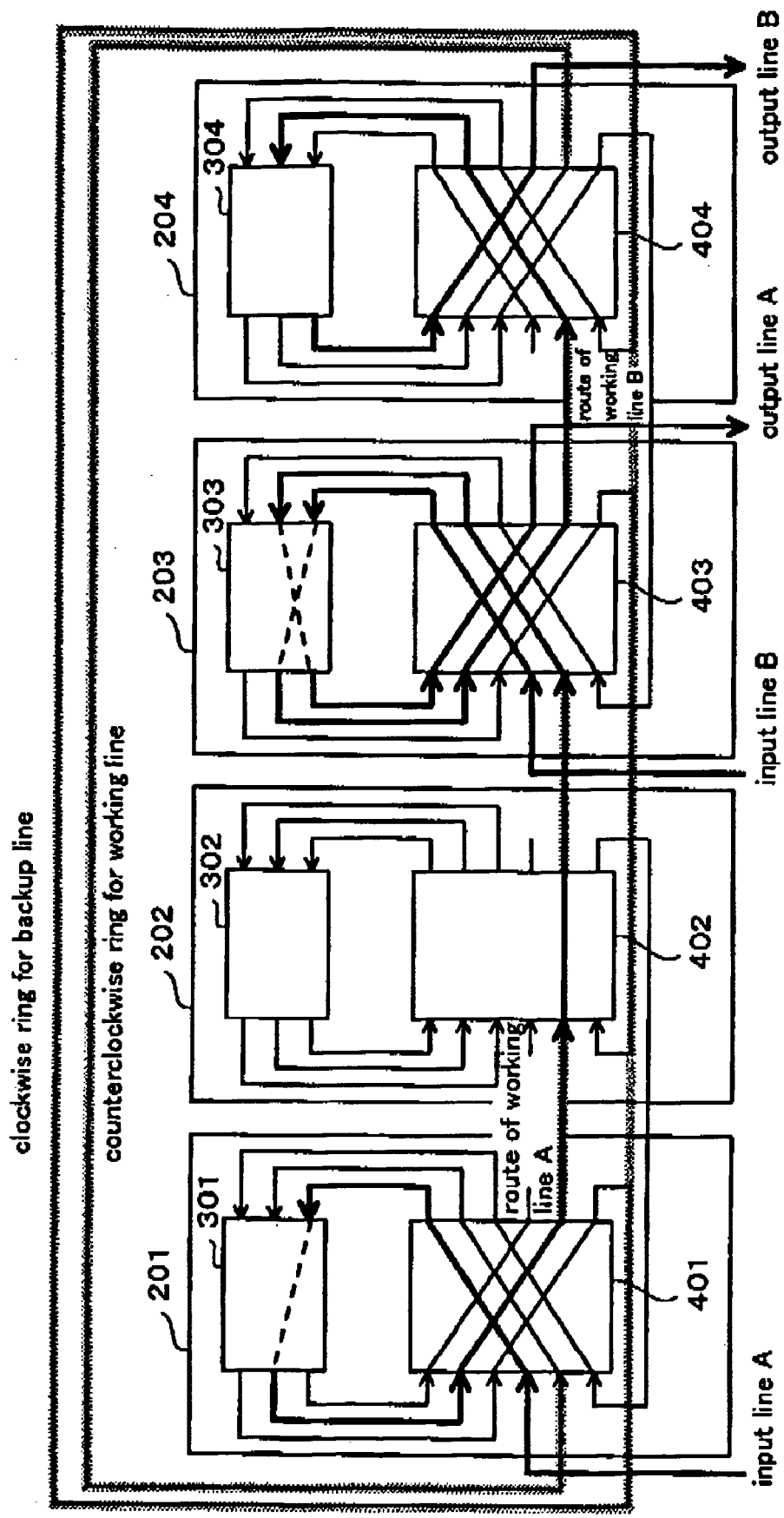
FIG. 5 is a block diagram showing an example of a network applied a shared ring protection scheme and an example of a route set-up for working lines.

FIG. 5 is a block diagram showing an example of a network to which a shared ring protection scheme is applied and an example of a route set-up for working lines. This network is configured by four line processing equipment 201 to 204 and includes a counterclockwise ring for working lines and a clockwise ring for backup lines. Line processing equipment 201 to 204 include 3 by 3 fast line switches 301 to 304 as line processing means and lie connection configuration devices 401 to 404, respectively.

In this example, line A is set up from line processing equipment 201 to line processing equipment 203 and line B is set up from line processing equipment 203 to line processing equipment 204. Routes of working lines A and B are set up along the counterclockwise ring for working lines. Routes of backup lines A and B, which become by-pass routes on a failure occurring, are set up along the clockwise ring for backup lines rounding in the opposite direction against the working lines. Line connection reconfiguration devices 401 to 404 set up connections so that such routes can be configured.

In line processing equipment 201, 203 and 204 at both ends of lines A and B, to which input and output lines A and B are connected, routes of working and backup lines A and B are set up through line switches 301, 303 and 304 to prepare switch-over from the working lines to the backup lines. That is, line connection reconfiguration devices 401, 403 and 404 are set up such that quick switch-over among the input terminals and the output terminals for the counterclockwise ring for working lines, the input terminals and the output terminals for the clockwise ring for backup lines, input lines A and B, and output lines A and B though line switches 301, 303 and 304 can be available. On line processing equipment 202, no connection to set up a route through line switch 302 is necessary. Line switch 302 itself is not required for lines A and B.

Figure 6:
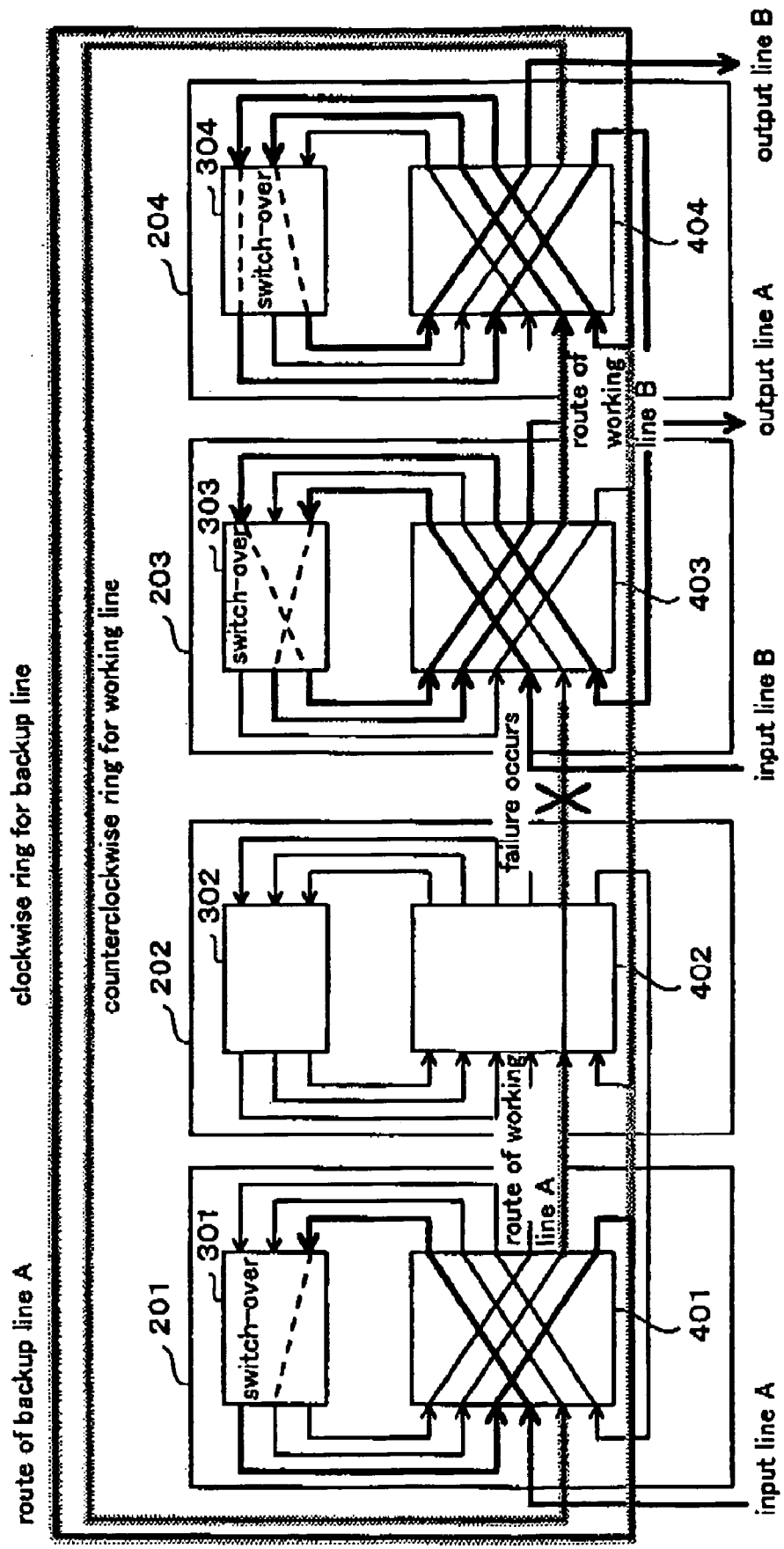
FIG. 6 shown an example of a route set-up for backup lines on the network shown in FIG. 5.

FIG. 6 shows an example of a route set-up for backup lines on the network shown in FIG. 5. When a failure occurs on working line A between line processing equipment 202 and 203, working line A becomes unusable and line switches

301, 303 and 304 are quickly operated to switch over from it to backup line A along the clockwise ring for backup lines. Line connection reconfiguration devices 401 to 404 are employed only to set up the routes of the working and backup lines through the line switches and are not related to the above protection switching operation.

Occurrence of a failure can be detected by extraordinary intensity or wavelength drift of optical signal on line processing equipment 203 to which output line A is connected. It can also be detected by other extraordinary phenomena such as parity errors of packets transmitted on the line, synchronization failure of time division multiplexed timeslots or frames or else. Failures can be detected at not only the line processing equipment to which an output line is connected but also the line processing equipment neighboring to the point where the failure occurs. For detecting failures, it way be effective to provide, as further line processing means, an error monitoring circuit or a test pattern generation/insertion circuit.

In the above examples shown FIG. 5 and FIG. 6, only a single counterclockwise uni-directional ring for working lines, or only one pair of uni-directional rings for working and backup lines, respectively, is installed. It may be possible to add a pair of uni-directional rings for working and backup lines, which results in a bi-directional ring configuration consisting of four rings. As fast line switches for a bi-directional ring, combination of two 3 by 3 line switches can be used, but the fast line switches should not be limited to 3 by 3 switches. Line switches having larger scale such as 6 by 6 line switches can also be used. If it is premised that input lines can not directly connected to output lines, it is not necessary that the fast line switches are strictly non-blocking.

Until a failure occurs, a backup line can be used as a line to transfer control signals or a working line to transfer signals having lower priorities. When a failure occurs, such a line should be forced to be torn down. Such a protection switching operation is applicable not only to a physical ring network but also a ring network which is configured by setting up connections between some line processing equipment selected from a plurality of line processing equipment of which an arbitrarily shaped mesh network consists.

Figure 7:
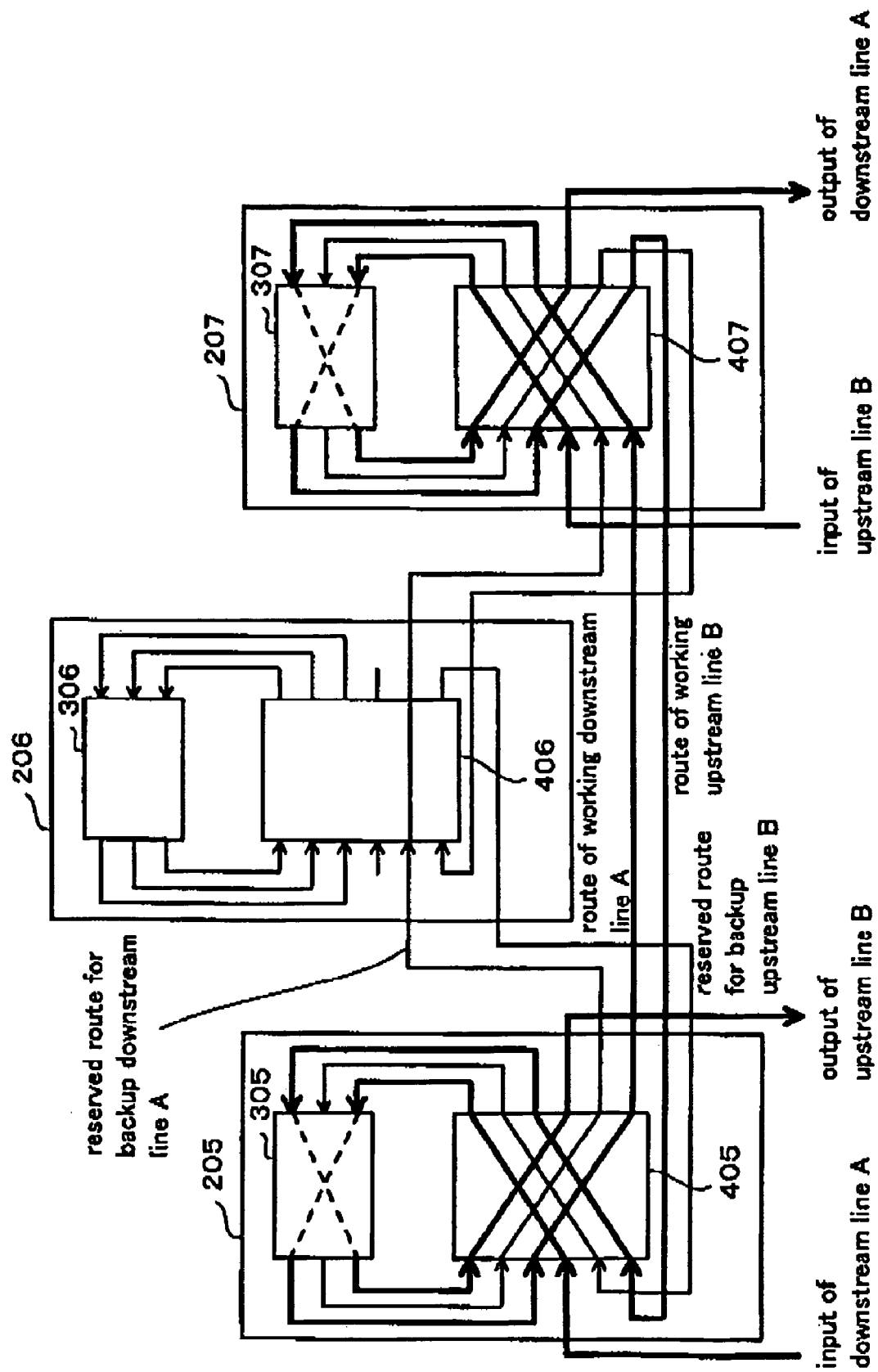
FIG. 7 is a block diagram showing an example of a network applied a redundant line protection scheme and an example of a route set-up for working lines.

FIG. 7 is a block diagram showing an example of a network to which a redundant line protection scheme is applied and an example of a route set-up for working lines. This network is configured by three line processing equipment 205 to 207 which include 3 by 3 fast line switches 305 to 307 as line processing means and line connection configuration devices 405 to 407 respectively.

In this example, a bi-directional line A which includes a downstream line A from line processing equipment 205 to line processing equipment 207 and an upstream line B in the opposite direction is set up. The route of working lines A and B is set up from line processing equipment 205 to line processing equipment 207 directly. The route of backup lines A and B for bypassing a failure is reserved through line processing equipment 206. Each backup line is reserved for the respective working line. For setting up such routes, line connection reconfiguration devices 405 to 407 are set up connections so that such routes can be configured.

In line processing equipment 205 and 207 at both ends of lines A and B, to which input and output lines A and B are connected, routes of the working and backup lines are set up through line switches 305 and 307 to prepare switch-over from the working lines to the backup lines. On line processing equipment 206, no connection to set-up a route through line switch 306 is necessary. Line switch 306 itself is not required for lines A and B.

Figure 8:
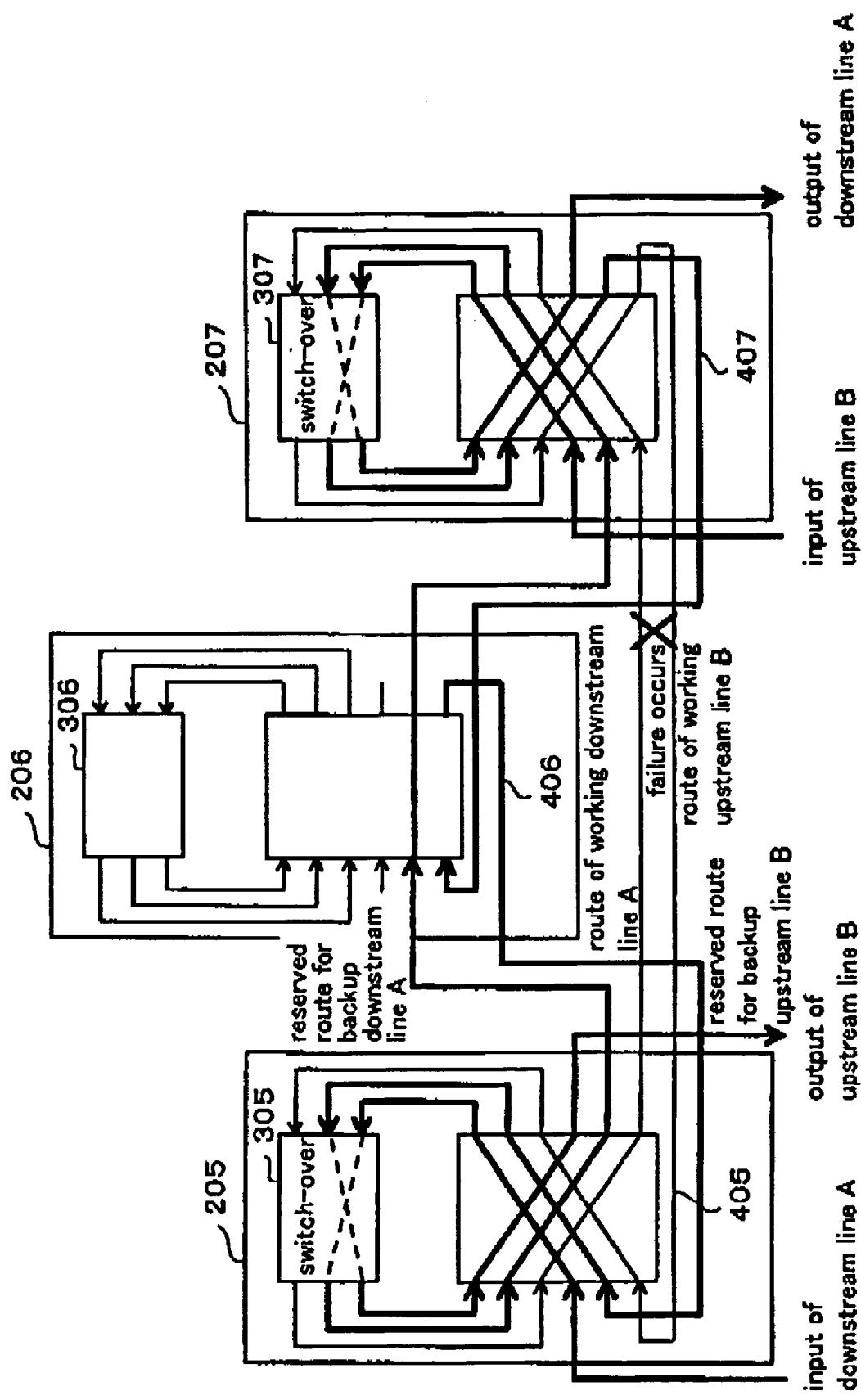
FIG. 8 shows an example of a route set-up for backup lines on the network shown in FIG. 7.

FIG. 8 shows an example of a route set-up for backup lines on the network shown in FIG. 7. When a failure occurs on working lines A and B between line processing equipment 205 and 207, working lines A and B become unusable and line switches 305 and 307 are quickly operated to switch over from it to backup lines A and B through line processing equipment 206. Line connection reconfiguration devices 405 to 407 are employed only to set up the routes of the working and backup lines through the line switches and are not related to the above protection switching operation.

Signals can be transmitted through both of the working and backup lines and one of these can be selected by the line processing equipment which is connected to the output line. Such a redundant configuration protection scheme is called "1+1 protection scheme". In such a scheme, the fast line switches of the line processing equipment connected to the input line have to include a multicast function for distributing signals into both of the working and backup lines. The fast line switches can be substituted by 1 by 2 optical splitter circuits.

Alternatively, until a failure occurs, a backup line can be used as a line to transfer control signals or a working line to transfer signals having lower priorities. Such a redundant configuration protection scheme is called "1:1 protection scheme".

The fast line switches should not be limited to 3 by 3 switches.

In the example shown in FIG. 7 and FIG. 8, the downstream and upstream lines are switched over to the backup lines together. If a failure occurs on only one of the lines, it can be switched over to the backup line individually. Such a protection switching operation is applicable to a plurality of line processing equipment of which an arbitrarily shaped mesh network consists.

Figure 9:
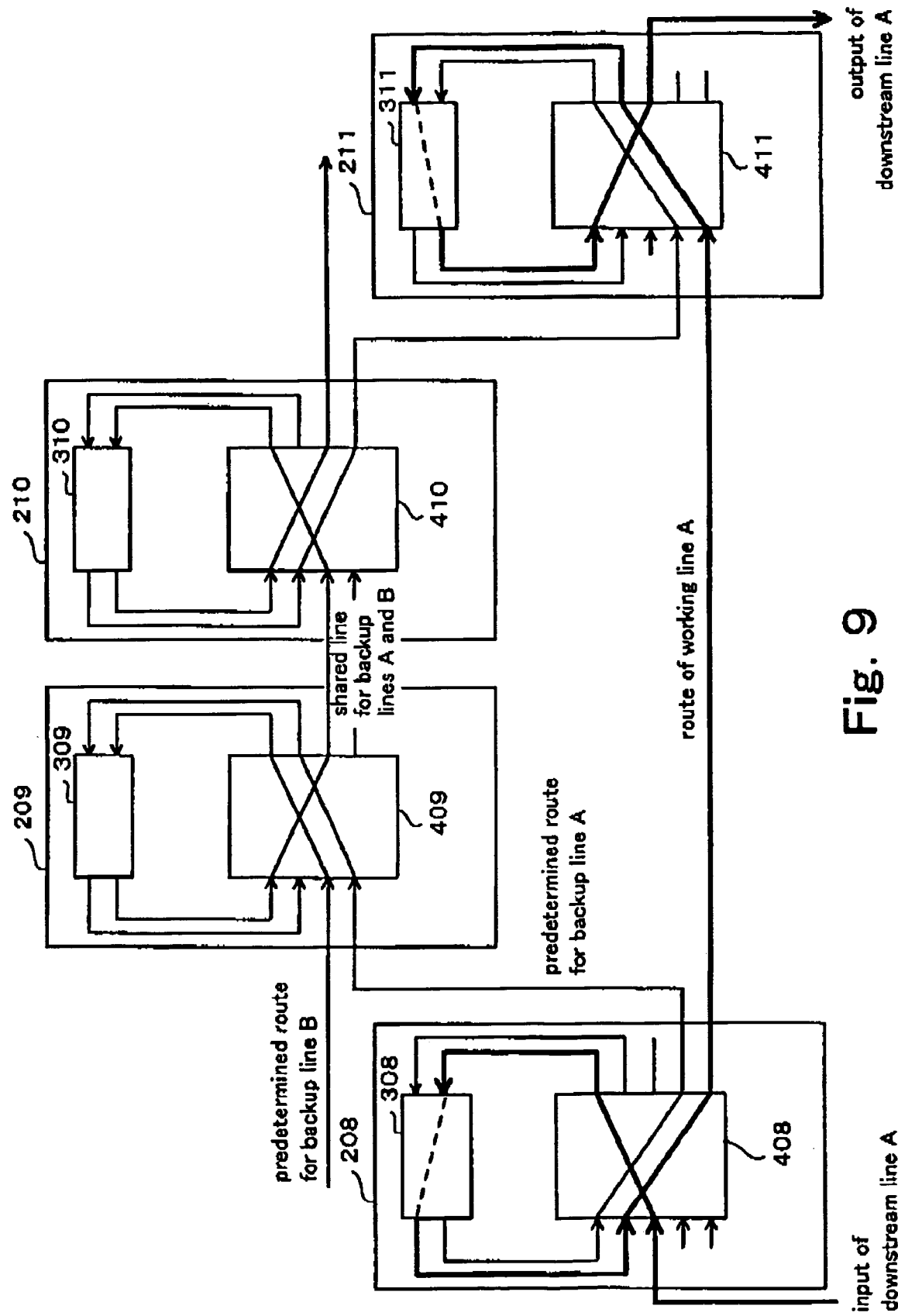
FIG. 9 is a block diagram showing an example of a network applied a shared backup line protection scheme and an example of a route set-up for working lines.

FIG. 9 is a block diagram showing an example of a network to which a shared backup line protection scheme is applied and an example of a route set-up for working lines. In this scheme, backup lines, whose routes are predetermined for working lines, partially share common lines. The network is configured by four line processing equipment 208 to 211 which include 2 by 2 fast line switches 308 to 311 as line processing means and line connection configuration devices 408 to 411 respectively.

In this example, line A is set up from line processing equipment 208 to line processing equipment 211. The route of working line A is set up directly from line processing equipment 208 to line processing equipment 211 and the route of backup line A for bypassing a failure is predetermined through line processing equipment 209 and 210. Line connection reconfiguration devices 408 to 411 set up connections so that such routes can be configured. The backup line A between line processing equipment 209 and 210 is partially shared by another predetermined backup line B and is usable by one of the two backup lines at one time. Such sharing is effective to reduce resources for back up lines.

In line processing equipment 208 and 211 at both ends of line A, routes of working and backup lines A are set up through line switches 308 and 311 to prepare switch-over from the working line to the backup line. In line processing equipment 209 and 210 at both ends of the line shared partially by backup lines A and B, a route of the backup line is set up through line switches 309 and 310 to prepare switch-over to the backup lines A or B.

Figure 10:
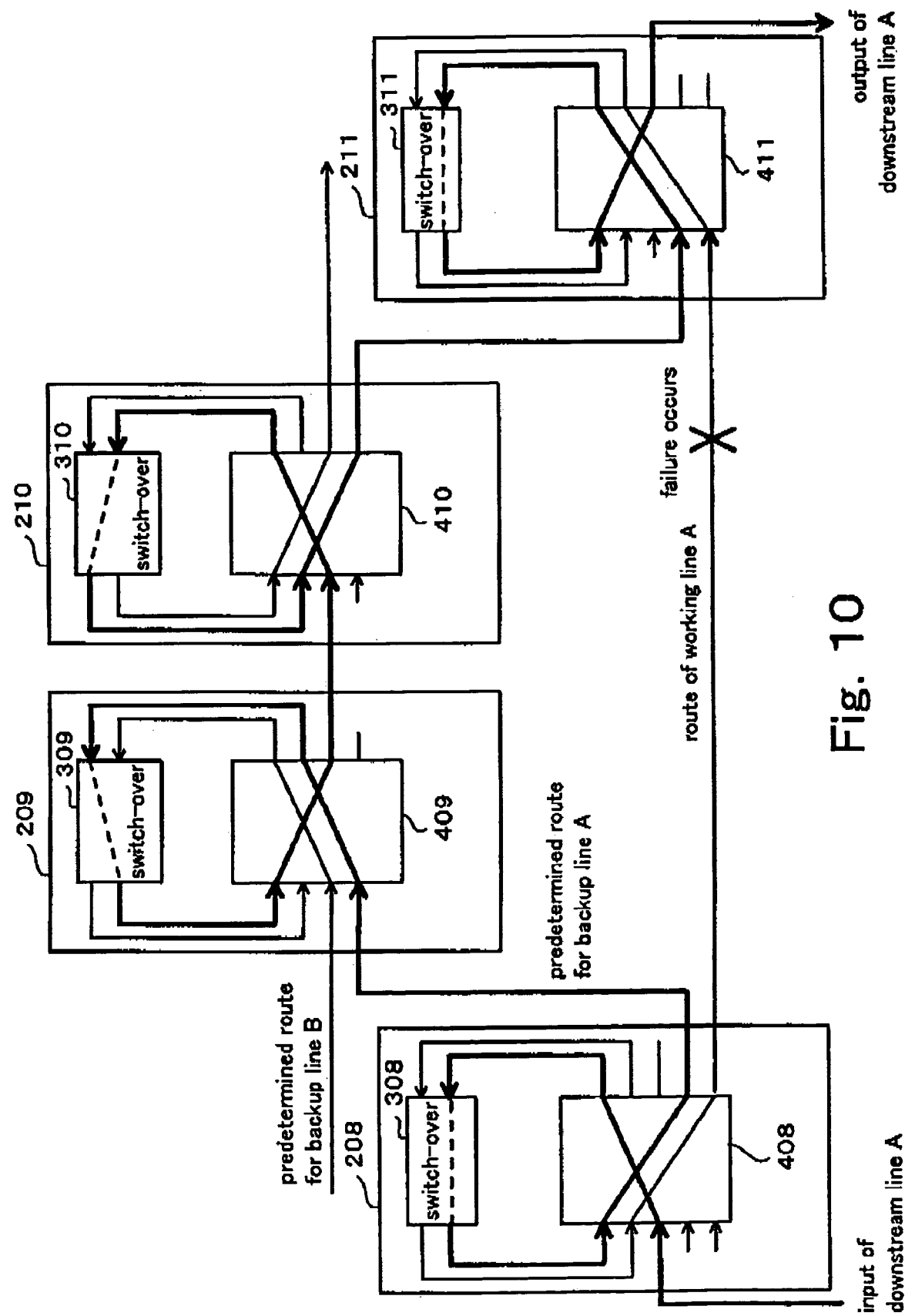
FIG. 10 shows an example of a route set-up for a backup line on the network shown in FIG. 9.

FIG. 10 shows an example of a route set-up for a backup line on the network shown in FIG. 9. When a failure occurs on working line A between line processing equipment 208 and 211, working line A becomes unusable and line switches 308 and 311 are quickly operated to switch over from it to backup line A through line processing equipment 209 and 210. In this state, backup line B is not usable. Line connection reconfiguration devices 408 to 411 are employed only to set up the routes of the working and backup lines through the line switches and are not related to the above protection switching operation.

This shared backup line protection scheme is called "1:n protection scheme. The fast line switches should not be limited to 2 by 2 switches. Line switches having larger scale, instead of 2 by 2 line switches, can also be used, so that more predetermined backup lines can partially share one common line. Such a protection operation is applicable to a plurality of line processing equipment of which an arbitrarily shaped mesh network consists.

Figure 11:
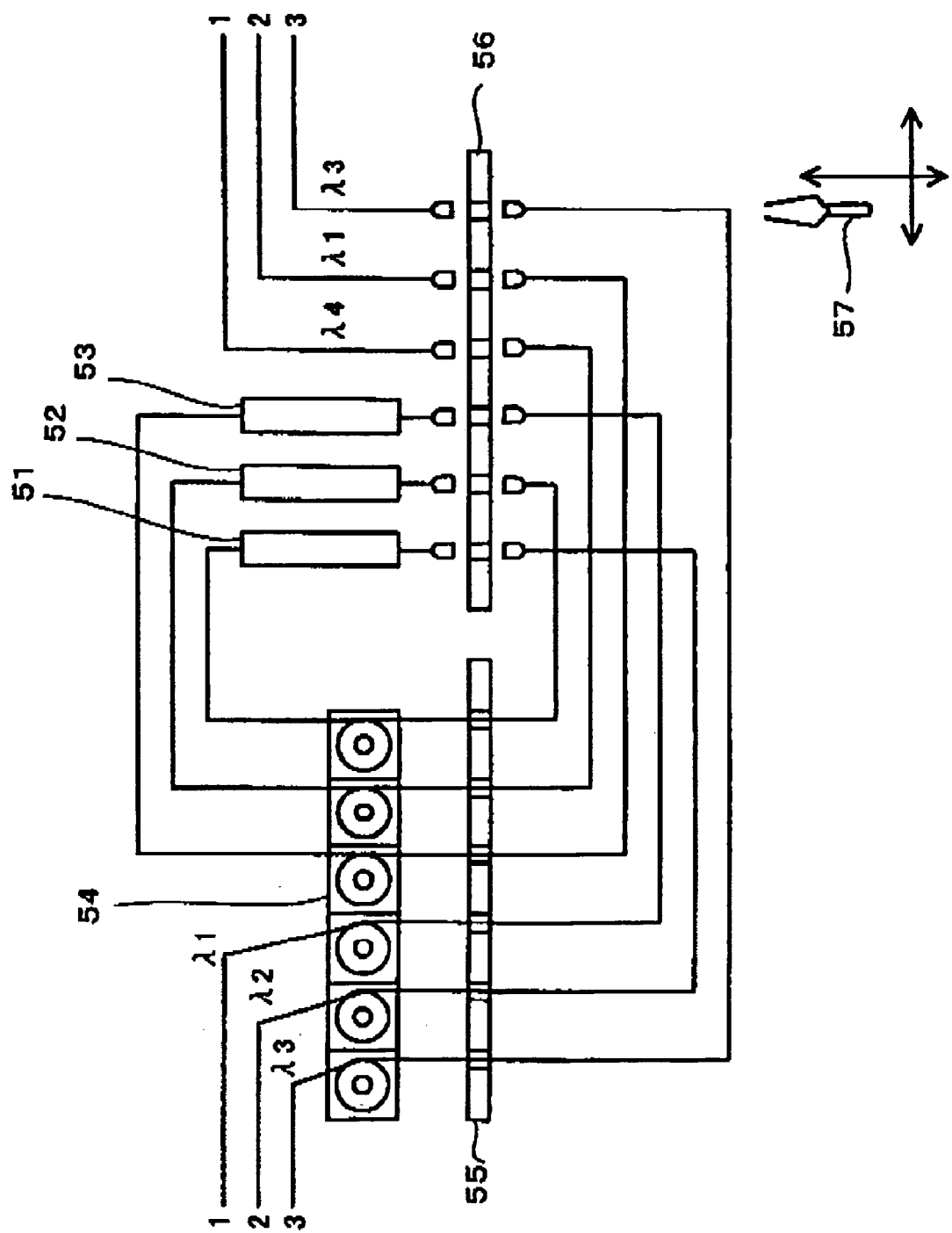
FIG. 11 is a block diagram showing a configuration of a line processing equipment according to a fifth embodiment of the present invention.

FIG. 11 is a block diagram showing a configuration of a line processing equipment according to a fifth embodiment of the present invention. This line processing equipment can provide an error monitoring function and/or a wavelength conversion function to an input optical fiber line by applying an automated MDF technology to the line connection reconfiguration device.

This line processing equipment includes, as line processing means, error monitoring circuits 51 and 53 and a wavelength converter 52. The line processing equipment further includes a bobbin 54 to roll up an excessive line cable, optical fiber cable aligning board 55, connector plug array board 56 and optical fiber connection reconfiguration robot 58.

Error monitoring circuits 51 and 53 are optical signal quality monitoring circuits for detecting extraordinary Intensity or wavelength drift of optical signal in the optical fiber lines. Circuits which detect parity errors of packets transmitted on the optical fiber lines, synchronization failure of time division multiplexed timeslots or frames or else can also be used for monitoring optical signal quality.

Input optical fiber lines and output terminals of error monitoring circuits 51 and 53 and an output terminal of wavelength converter 52 are connected to one surface of connector plug array board 56 through connectors, respectively. And output optical fiber lines and output terminal of error monitoring circuits 51 and 53 and an output terminal of wavelength converter 52 are connected to the other surface of connector plug array board 56 through connectors, respectively. Optical fiber connection reconfiguration robot 58 inserts the connectors into and pulls them out of connector plug array board 56 automatically according to a connection setup operation.

In the shown example, the connection setup on connector plug array board 56 is configured such that an optical signal having wavelength λ1 inputted from an input optical fiber line passes through error monitoring circuit 53 and goes into an optical signal outputted to an output optical fiber line. It is also configured such that an optical signal having wavelength λ2 inputted from an input optical fiber line passes through error monitoring circuit 51 and wavelength converter 52 and goes into an optical signal having wavelength λ4 outputted to an output optical fiber line. Wavelength converter 52 carries out wavelength conversion from λ2 to λ4. It is also configured such that an optical signal having wavelength λ3 inputted from an input optical fiber line is outputted to an output optical fiber line as it is.

In this embodiment, it is possible to reduce the size of the line processing equipment and to simplify a wiring between devices by uniting error monitoring circuits 51 and 53, wavelength converter 52 and optical fiber connection reconfiguration robot 58.

Figure 12:
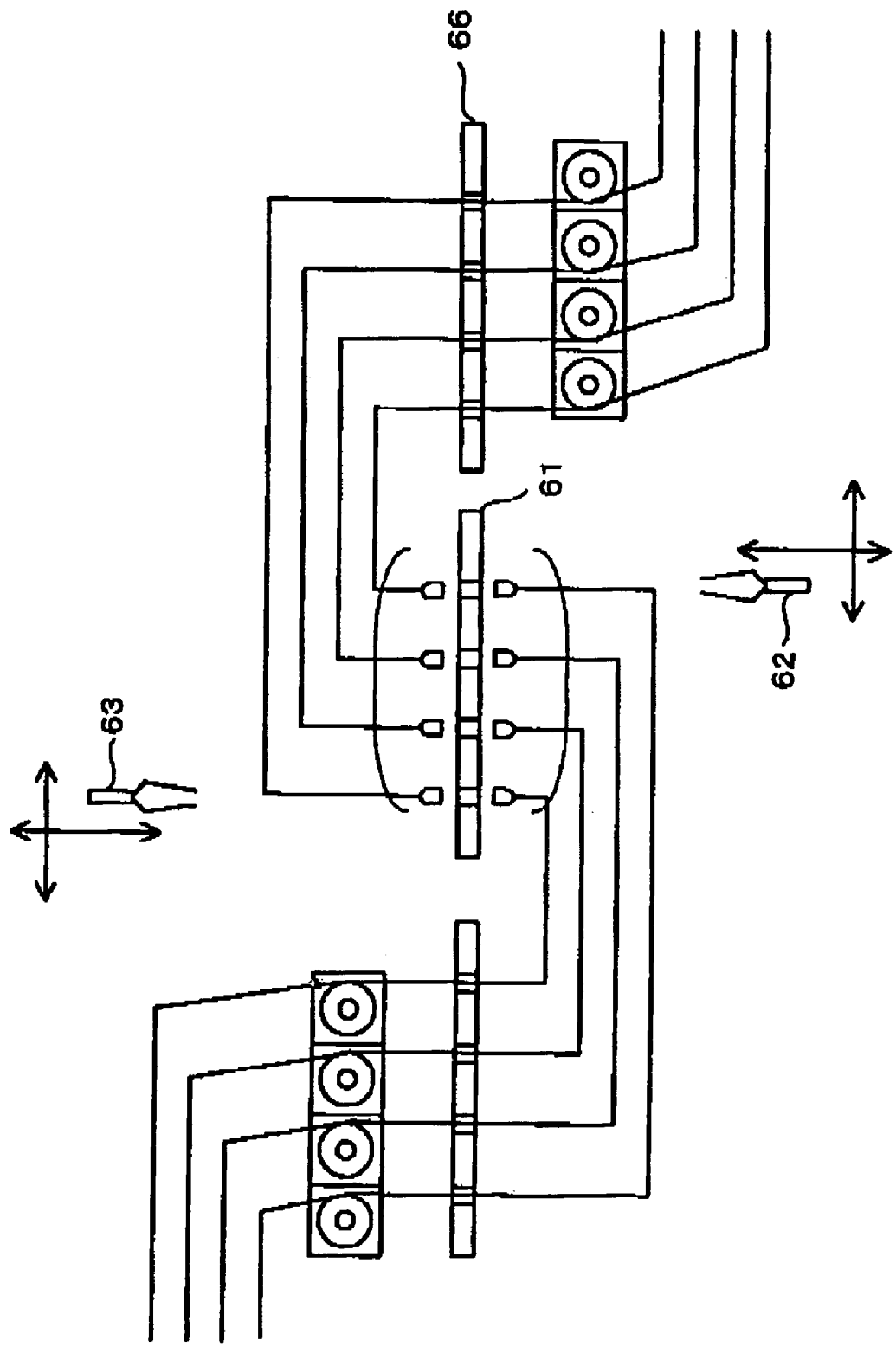
FIG. 12 is a block diagram showing a configuration of a line processing equipment according to a sixth embodiment of the present invention.

FIG. 12 shows a configuration of a line processing equipment according to a sixth embodiment of the present invention. In this embodiment, the reliability of the line processing equipment is improved by installing two optical fiber connection reconfiguration robots, to each of which the automated MDF technology is applied.

That is, the sixth embodiment includes connector plug array board 61, which has one surface to which input optical fiber lines are connected through respective connectors and the other surface to which output optical fiber lines are connected through respective connectors, and optical fiber connection reconfiguration robots 62 and 63 for automatically inserting the connectors into and pulling them out of connector plug array board 61 according to a setup operation of connections between the input optical fiber lines and the output optical fiber lines. Optical fiber connection reconfiguration robots 62 and 63 are installed on both surfaces of connector plug array board 61.

According to this configuration, in case where a failure occurs in one of optical fiber connection reconfiguration robots 62 and 63, the connection reconfiguration can be executed by the other optical fiber connection reconfiguration robot. Therefore, the reliability of the line processing equipment is improved compared with the case in which only one optical fiber connection reconfiguration robot is used.

In case where a failure occurs in a portion of connector plug array board 61, it is possible to move the connectors on both the input optical fiber line side and the output optical fiber line side to a different portion of connector plug array board 61, in which there is no failure, by operating both of optical fiber connection reconfiguration robots 62 and 63.

Instead of optical fiber connection reconfiguration robots, a plurality of element line connection reconfiguration devices can be cascaded serially so that they form a single line connection reconfiguration equipment. Any one of the element line connection reconfiguration devices can be operated for a connection set up and reconfiguration. Such a redundant configuration can also improve the reliability.

Figure 13:
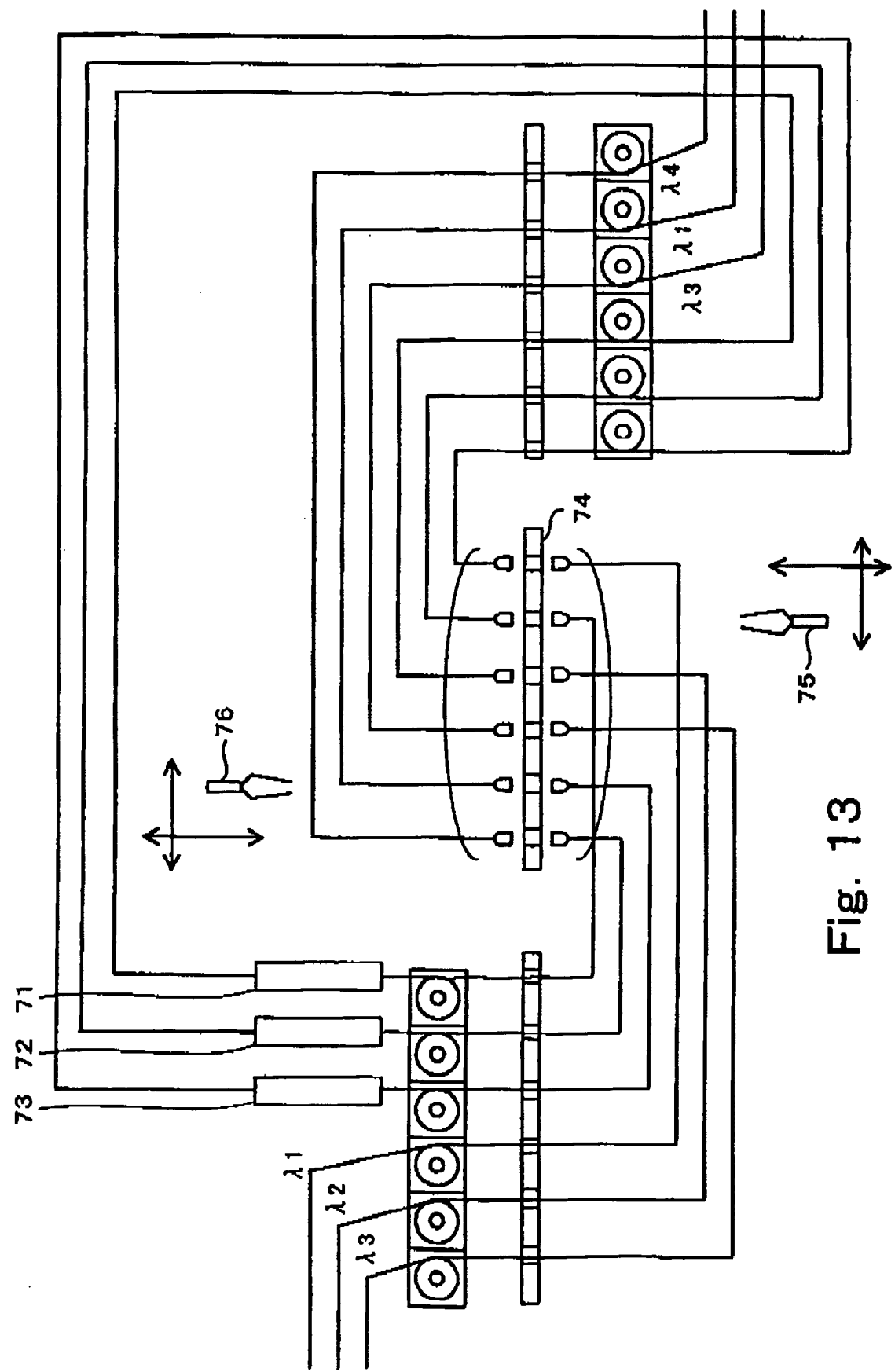
FIG. 13 is a block diagram showing a configuration of a line processing equipment according to a seventh embodiment of the present invention.
Figure 14:
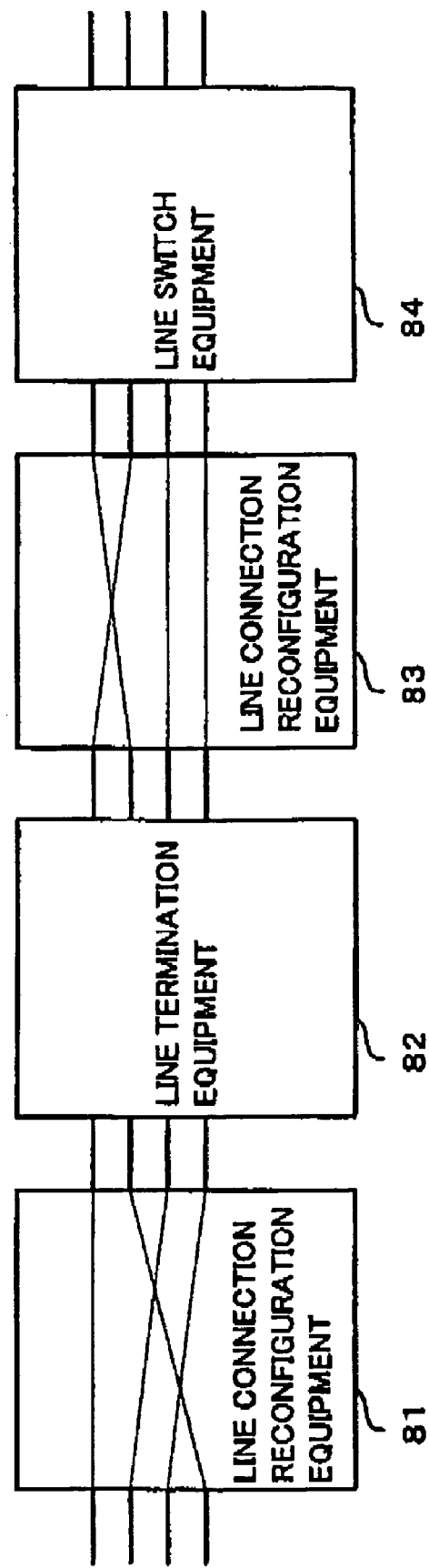
FIG. 14 is a block diagram showing a configuration of a conventional line processing equipment.
Figure 15:
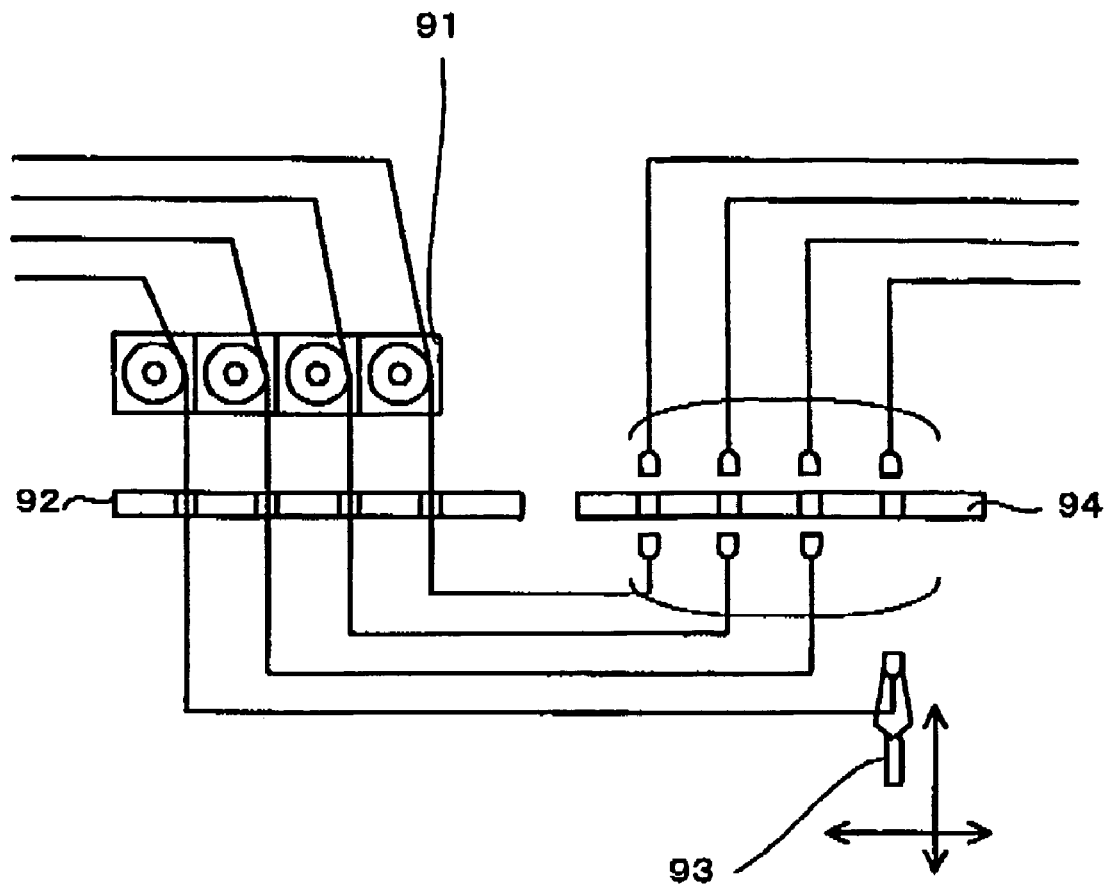
FIG. 15 is a block diagram showing a configuration of a conventional line connection reconfiguration equipment.
Figure 16:
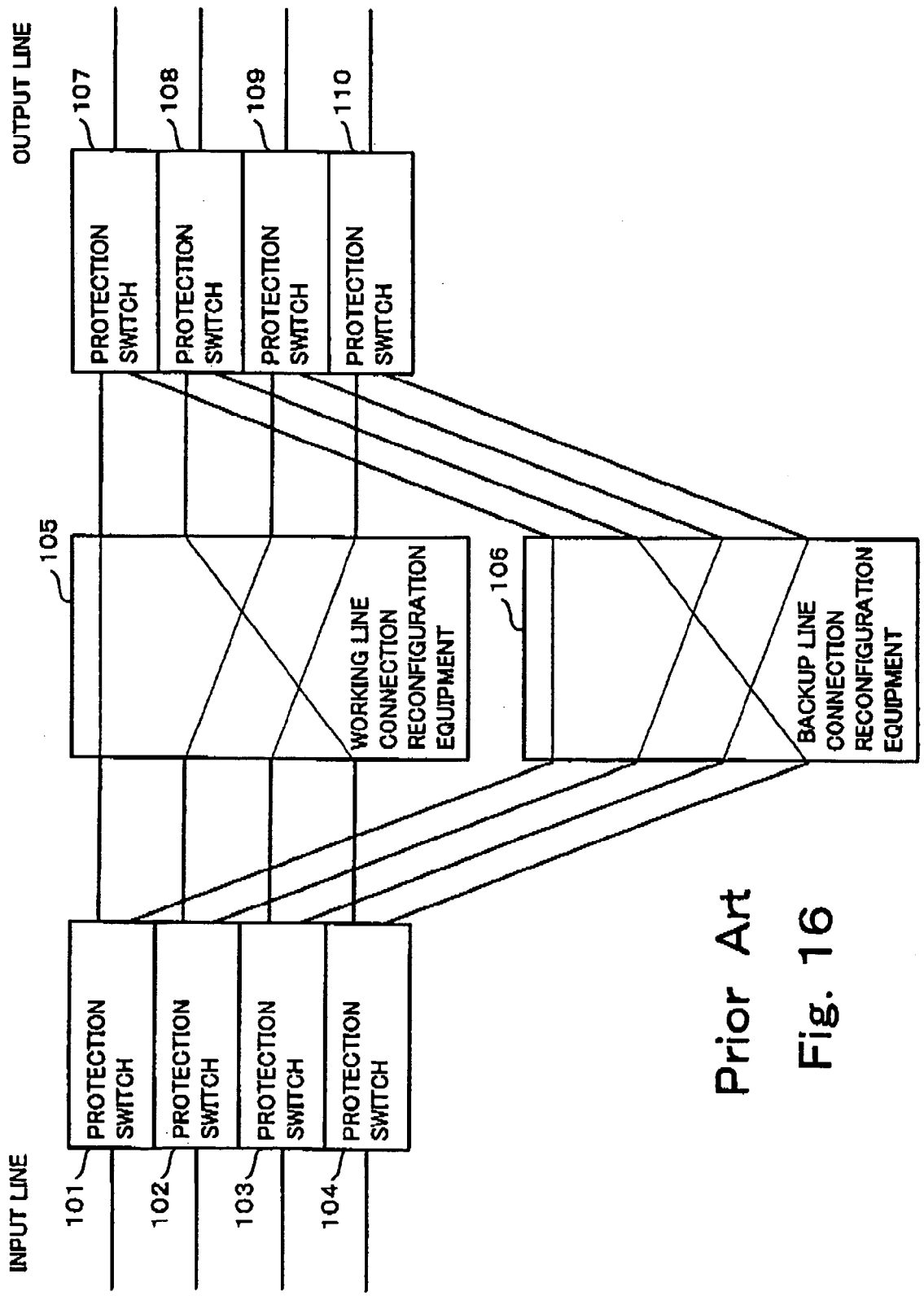
FIG. 16 is a block diagram showing a configuration of a conventional redundant line connection reconfiguration equipment.

FIG. 13 is a block diagram of a configuration of a line processing equipment according to a seventh embodiment of the present invention. This embodiment is a combination of the embodiments shown in FIG. 11 and FIG. 12 and provides an error monitoring function and/or a wavelength conversion function to each of input optical fiber lines by utilizing an automated MDF having improved reliability.

That is, this embodiment includes, as line processing means, error monitoring circuits 71 and 73 and wavelength converter 72. The line connection reconfiguration equipment includes connector plug array board 74, which has one surface to which input optical fiber lines are connected through respective connectors and the other surface to which output optical fiber lines are connected through respective connectors, and optical fiber connection reconfiguration robots 75 and 76 for automatically inserting the connectors into and pulling them out of connector plug array board 74 according to a setup operation of connections between the input optical fibers and the output optical fibers. Optical fiber connection reconfiguration robots 75 and 76 are installed on respective surfaces of connector plug array board 74.

As the line processing means, various circuits other than those described in the first to sixth embodiments, such as an amplifier circuit, a 1 by N splitter circuit, an error correction circuit, a test signal generator/adder circuit, etc can be installed. The present invention is not limited to such kind of line processing means.

According to the present invention, it is possible to arbitrarily set up the connection between the input lines, the line processing means and the output lines by using only one line connection reconfiguration device and to flexibly change the sequence of processing functions and the processing function themselves necessary to each input lines, on demand.

What is claimed is:

1. A line processing equipment comprising:
    at least one line processing means for processing respective lines; and
    line connection reconfiguration means to set up and reconfigure connections from input lines coming into said line processing equipment to either said line processing means or output lines going out of said line processing equipment and connections from said line processing means either back to said line processing means or to said output lines,
    wherein said line connection reconfiguration means includes a connector plug array board having one surface onto which said input lines and outputs of said line processing means are connected through respective connectors and the other surface onto which said output lines and inputs of said line processing means are connected through respective connectors and an automatic mechanism manipulating insertion and pulling of said connectors on at least one of said one and the other surfaces according to setup and reconfiguration of said connections.

2. A line processing equipment as claimed in claim 1, wherein said line connection reconfiguration means includes a plurality of input terminals and a plurality of output terminals and sets up arbitrary connections between said input terminals and said output terminals and reconfigures said connections; and wherein said input lines and outputs of said line processing means are connected to said input terminals respectively and said output terminals are connected to inputs of said line processing means and said output lines respectively.

3. A line processing equipment as claimed in claim 1, wherein said line connection reconfiguration means has a redundant structure consisting of a plurality of element line connection reconfiguration means cascaded serially so that any one of said element line connection reconfiguration means can set up and reconfigure said connections.

4. A line processing equipment as claimed in claim 1, wherein said automatic mechanism manipulates insertion and pulling of said connectors on both of said one and the other surfaces respectively.

5. A line processing equipment as claimed in claim 1, wherein said input lines and said output lines are optical fiber lines which transmit packet multiplexed, time division multiplexed and/or wavelength division multiplexed optical signals.

6. A line processing equipment as claimed in claim 5, wherein at least one of said line processing means is a packet switch for switching said packet multiplexed optical signals.

7. A line processing equipment as claimed in claim 5, wherein a plurality of said line processing means are provided, at least two of said line processing means are packet switches for switching said packet multiplexed optical signals and wherein said line connection reconfiguration means sets up and reconfigures said connections from said outputs of some of said packet switches to said inputs of others of said packet switches.

8. A line processing equipment as claimed in claim 5, wherein at least one of said line processing means is a time division switch for switching said time division multiplexed optical signals.

9. A line processing equipment as claimed in claim 5, wherein at least one of said line processing means is a wavelength demultiplexer for demultiplexing said wavelength division multiplexed optical signals into a plurality of optical signals.

10. A line processing equipment as claimed in claim 9, wherein said wavelength demultiplexer includes a waveband demultiplexer for demultiplexing said wavelength division multiplexed optical signals into a plurality of optical signals each of which includes a waveband consisting of a plurality of wavelength.

11. A line processing equipment as claimed in claim 5, wherein at least one of said line processing means is a wavelength multiplexer for multiplexing a plurality of optical signals into a wavelength division multiplexed optical signal.

12. A line processing equipment as claimed in claim 11, wherein said wavelength multiplexer includes a waveband multiplexer for multiplexing optical signals each of which includes a waveband consisting of a plurality of wavelength into said wavelength division multiplexed optical signal.

13. A line processing equipment as claimed in claim 5, wherein at least one of said line processing means is a wavelength converter for said optical signals.

14. A line processing equipment as claimed in claim 5, wherein at least one of said line processing means is a circuit for monitoring optical signal quality of said optical signals.

15. A line processing equipment as claimed in claim 5, wherein at least one of said line processing means is a circuit for generating test patterns and inserting said test patterns into said optical signals.

16. A line processing equipment as claimed in claim 5, wherein at least one of said line processing means is a line switch for switching said optical signals.

17. A line processing equipment as claimed in claim 16, wherein
    said line connection reconfiguration means sets up and reconfigures said connections between said input optical fiber lines, inputs and outputs of said line switch and said output optical fiber lines, and configures working lines and backup lines; and wherein
    said line switch carries out protection switching from said working lines to said backup lines when a failure occurs on said working lines.

18. A line processing equipment as claimed in claim 17, wherein
    a plurality of said line processing equipment are interconnected to form a network; and wherein
    said line switch carries out protection switching from working lines to said backup lines in a shared ring protection scheme.

19. A line processing equipment as claimed in claim 17, wherein
    a plurality of said line processing equipment are interconnected to form a network; and wherein
    said line switch carries out protection switching from said working lines to said backup lines in a redundant line protection scheme.

20. A line processing equipment as claimed in claim 17, wherein
    a plurality of said line processing equipment are interconnected to form a network; and wherein
    said line switch carries out protection switching from said working lines to said backup lines in a shared backup line protection scheme.

* * * * *